US012426745B2

(12) United States Patent
Cho et al.

(10) Patent No.: US 12,426,745 B2
(45) Date of Patent: Sep. 30, 2025

(54) DIGITAL TISSUE STORAGE BOX

(71) Applicants: Moo Jeoung Cho, Seoul (KR); Ha Ram Kim, Seoul (KR)

(72) Inventors: Moo Jeoung Cho, Seoul (KR); Ha Ram Kim, Seoul (KR)

(*) Notice: Subject to any disclaimer, the term of this patent is extended or adjusted under 35 U.S.C. 154(b) by 0 days.

(21) Appl. No.: 18/042,953

(22) PCT Filed: Oct. 19, 2022

(86) PCT No.: PCT/KR2022/015902
§ 371 (c)(1),
(2) Date: Feb. 24, 2023

(87) PCT Pub. No.: WO2023/085633
PCT Pub. Date: May 19, 2023

(65) Prior Publication Data
US 2024/0268611 A1 Aug. 15, 2024

(30) Foreign Application Priority Data
Nov. 11, 2021 (KR) .......................... 10-2021-0155048

(51) Int. Cl.
A47K 10/36 (2006.01)
G06F 3/01 (2006.01)

(52) U.S. Cl.
CPC .............. A47K 10/36 (2013.01); G06F 3/017 (2013.01); A47K 2010/3668 (2013.01)

(58) Field of Classification Search
CPC .. A47K 10/36; A47K 2010/3668; G06F 3/017
See application file for complete search history.

(56) References Cited

U.S. PATENT DOCUMENTS 9,032,470 B2* 5/2015 Meuninck ............ H04N 21/422
715/848
9,794,511 B1* 10/2017 McQueen .............. H04N 7/142
2002/0126150 A1* 9/2002 Parry ...................... G06F 3/147
715/771

(Continued)

FOREIGN PATENT DOCUMENTS

JP 2014-132747 A 7/2014
KR 10-2013-0044716 A 5/2013

(Continued)

Primary Examiner — Tadesse Hailu
(74) Attorney, Agent, or Firm — Studebaker Brackett PLLC

(57) ABSTRACT

The present invention relates to a digital tissue storage box, and more particularly, to a digital tissue storage box simultaneously serving as a clock, a calendar, a frame, and the like while storing tissues. A digital tissue storage box according to an embodiment of the present invention includes a main body having a space for storing a tissue, an entrance which is formed in one surface of the main body and through which the tissue is pulled out of the main body, one or more displays which are provided on the main body and on which a screen is displayed according to a user input, one or more sensors provided on the main body to detect movement and an environment in a preset area, and a processor configured to control the one or more displays according to the user input or a result detected by the sensor.

19 Claims, 7 Drawing Sheets

(56) References Cited

U.S. PATENT DOCUMENTS

| | | | |
|---|---|---|---|
| 2006/0170669 A1* | 8/2006 | Walker | H04N 1/00352 |
| | | | 715/255 |
| 2007/0119858 A1* | 5/2007 | Ayoub | A47K 10/421 |
| | | | 221/2 |
| 2008/0109317 A1* | 5/2008 | Singh | G06Q 30/0254 |
| | | | 705/14.5 |
| 2008/0235100 A1* | 9/2008 | Armstrong | G06Q 30/02 |
| | | | 705/15 |
| 2010/0138365 A1* | 6/2010 | Hirvela | H04L 63/126 |
| | | | 709/217 |
| 2013/0132169 A1* | 5/2013 | Dooley | G06Q 30/00 |
| | | | 705/14.1 |
| 2016/0054896 A1* | 2/2016 | Takahashi | G06F 3/04886 |
| | | | 715/810 |
| 2018/0249735 A1* | 9/2018 | Espinosa | G06Q 10/083 |
| 2022/0392081 A1* | 12/2022 | Ryan | G06V 40/20 |
| 2023/0111141 A1* | 4/2023 | Skarda | H05B 47/19 |
| | | | 362/85 |

FOREIGN PATENT DOCUMENTS

| | | |
|---|---|---|
| KR | 10-2014-0098993 A | 8/2014 |
| KR | 10-2015-0019169 A | 2/2015 |
| KR | 10-1633415 B1 | 6/2016 |

\* cited by examiner (a)

301

(b)

302

(a)

(b)

(a)

(b)

DIGITAL TISSUE STORAGE BOX

CROSS-REFERENCE TO RELATED APPLICATIONS

This application is the U.S. National Stage of International Application No. PCT/KR2022/015902 filed Oct. 19, 2022, which claims benefit of priority to Korean Patent Application No. 10-2021-0155048 filed Nov. 11, 2021, the entire content of which is incorporated herein by reference.

TECHNICAL FIELD

The present invention relates to a digital tissue storage box, and more particularly, to a digital tissue storage box simultaneously serving as a clock, a calendar, a frame, and the like while storing tissues.

BACKGROUND ART

In general, tissues are stored and used in a form put into a case such as a box in which two tissues are stacked to overlap each other in opposite directions such that tissues are consecutively pulled out one by one. Such a tissue case is mainly and widely used indoors, such as at home, in hotels, and in restaurants.

A tissue case is mainly used while being placed on a dining table or a table. In most cases, not only a tissue case but also various items such as a calendar, a clock, and a frame are placed on a dining table or a table.

Such items are placed on the dining table or the table and thus occupy a large space and also make the dining table or the table look crowded.

DETAILED DESCRIPTION

Technical Problem

The present invention is directed to providing a digital tissue storage box simultaneously serving as a clock, a calendar, a frame, and the like while storing tissues.

The objects to be solved by the present invention are not limited to the above-described objects, and other objects that are not described herein will be clearly understood by those skilled in the art from the following descriptions.

Technical Solution

According to an embodiment of the present invention, a digital tissue storage box includes a main body having a space for storing a tissue, an entrance which is formed in one surface of the main body and through which the tissue is pulled out of the main body, one or more displays which are provided on the main body and on which a screen is displayed according to a user input, one or more sensors provided on the main body to detect movement and an environment in a preset area, and a processor configured to control the one or more displays according to the user input or a result detected by the sensor.

The processor may set a screen configuration set by a user as a main screen of the display and may perform control so that the set main screen is output on the one or more displays, based on the user input, the processor may set a screen configuration according to movement of the user as a sub screen, and based on a result of detecting the movement of the user, the processor may perform control so that the main screen, which is output on the display, is changed into and outputs the sub screen.

Based on the user input, the processor may set the one or more displays as a main display, based on the user input, the processor may set a screen configuration according to movement of a user as a sub screen, and based on a result of detecting the movement of the user, the processor may perform control so that the sub screen is output on the main display.

The sensor may detect at least one of illuminance, temperature, and humidity of a space in which the digital tissue storage box is positioned and transmit a detected result to the processor, and the processor may perform control so that information about the at least one of the temperature and the humidity detected by the sensor is output on the one or more displays and may perform control so that brightness of the one or more displays becomes preset brightness in response to a result of detecting the illuminance of the space in which the digital tissue storage box is positioned.

As a result of detecting the illuminance, the processor may extract a display brightness value that is stored to match the detected illuminance and may control the one or more displays to have the extracted display brightness value, when the detected illuminance is low, the processor may control the one or more displays to decrease brightness, and when the illuminance is high, the processor may control one or more displays to increase brightness.

The sensor may detect movement of a user in the preset area and may transmit a detected result to the processor, based on the detected result, the processor may determine a position of the user, and the processor, based on a determination result, may perform control so that a screen is output to one area closer to the user in an area of a display on which the screen is being output, or based on the determination result, may control the display to output the screen on a display positioned close to the user among the one or more displays.

The digital tissue storage box may further include a camera provided on the main body to photograph the preset area and transmit a photographed result to the processor, wherein the processor determines the user's gaze using at least one of the detected result and the photographed result, and the processor, based on a determination result, performs control so that the screen is output to one area to which the user's gaze is directed in the area of the display in which the screen is being displayed, or based on the determination result, controls the display to output the screen on a display positioned in a direction in which the user's gaze is directed among the one or more displays.

The processor may determine a distance between the digital tissue storage box and the user using at least one of the detected result and the photographed result, and based on a determination result, when the distance to the user is greater than or equal to a certain distance, the processor may control the display to increase an aspect ratio of a screen of the display, to which the user's gaze is directed, or increase a font size of a character output on the screen.

The processor may recognize a gesture of the user using at least one of the detected result and the photographed result and may control the screen of the one or more displays according to a screen configuration stored to match the recognized gesture or a screen setting.

The processor may store nutritional information about nutrients and efficacy according to a type of food, may analyze an image or video captured by the camera to determine a type of photographed food, may extract nutrient and efficacy information of the determined food from the nutritional information, and may perform control so that the extracted nutrient and efficacy information is output on the display.

The processor may obtain at least one user account, may perform control so that a calendar stored in the user account is linked and displayed on the one or more displays, and may perform control so that an alarm is output according to whether the alarm is set for each schedule.

The digital tissue storage box may further include a light positioned near the entrance, wherein, when a specific gesture is detected from a user or an impact of a certain intensity or more is applied to the digital tissue storage box, the processor turns the light on or off or changes a color of the light.

The digital tissue storage box may further include a microphone provided on one surface of the main body, wherein the processor registers at least one piece of voice information input through the microphone, after registering the voice information, the processor compares a voice output through the microphone with a content of the registered voice information, and when the voice input through the microphone corresponds to the content of the registered voice information, the processor performs control so that the screen of the one or more displays is changed according to a command corresponding to the registered voice information.

The processor may analyze a speed, a pitch, and a volume of the voice input through the microphone, based on an analysis result, the processor may determine a user of the voice input through the microphone, and based on a screen setting that is stored to match each user, the processor may perform control so that a screen to which screen brightness and a font size corresponding to the screen setting of the determined user are applied is output.

The digital tissue storage box may include a communication module which is connectable to a network server or another terminal, wherein the processor acquires weather information through the communication module to perform control so that the weather information is output on the one or more displays and controls the screen of the one or more displays according to a command received from a terminal connected through the communication module.

The processor may store one or more images obtained through the communication module in a memory, may set a display sequence and a display time for the one or more images based on the user input, and may perform control so that the plurality of images are sequentially displayed on the one or more displays according to the set display time.

The processor may perform control so that a menu obtained from the network server is output on the one or more displays, may perform control so that origin information and nutrient component information of a prestored food material are displayed on the display in response to a menu item selection command input from a user, and may calculate an amount of exercise required when a menu item is ingested based on the nutrient component information and perform control so that the calculated amount of exercise is output on the display.

The processor may perform control so that the screen of the display is turned on or off according to a preset condition, and the processor may turn the screen of the display on or off based on a preset time or period, when movement of a user is not detected in the preset area from the digital tissue storage box for a certain time by the sensor, may turn the screen of the display off, or in a state in which the screen of the display screen is turned off, when the movement of the user is detected by the sensor, may turn the screen of the display on.

The digital tissue storage box may further include a power supply configured to supply power to the tissue storage box, wherein the power supply supplies power to the tissue storage box and a battery when connected to a socket in a wired manner and supplies power to the tissue storage box through the battery when not connected to the socket.

The digital tissue storage box may further include a cradle which is formed on one surface of the main body and on which a terminal is mounted, wherein the power supply supplies power to the terminal when the terminal is mounted on the cradle.

Details of other embodiments are included in the detailed description and the accompanying drawings.

Advantageous Effects

A digital tissue storage box according to the present invention can simultaneously serve as a clock, a calendar, a frame, and the like while storing tissues.

Effects of the present invention are not limited to the above-described effects, and other effects which have not been described above will be clearly understood by those skilled in the art from the following descriptions.

MODES OF THE INVENTION

Figure 1:
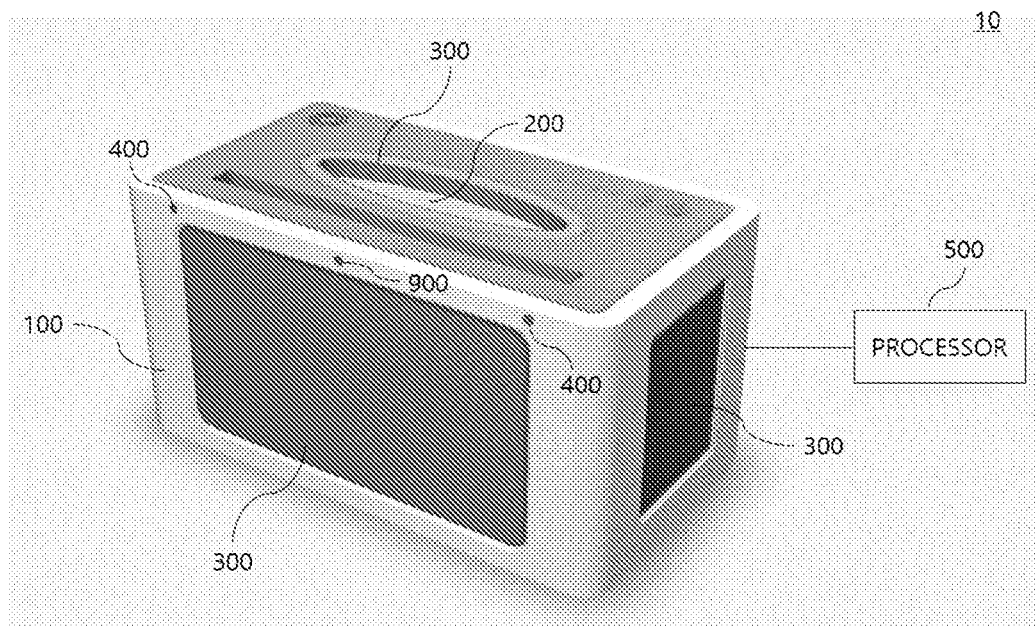
FIG. 1 is a diagram illustrating a tissue storage box according to an embodiment of the present invention.

The advantages and features of the present invention and methods for accomplishing the same will be more clearly understood from embodiments to be described in detail below with reference to the accompanying drawings. However, the present invention is not limited to the following embodiments but may be implemented in various different forms. The present embodiments are provided only to complete the present invention and to fully provide the scope of the present invention to a person having ordinary skill in the art to which the present invention pertains, and the present invention will be defined by the appended claims.

Terms used herein are intended to illustrate embodiments but are not intended to limit the present invention. As used herein, the singular forms "a" and "an" are intended to include the plural forms as well, unless the context clearly indicates otherwise. It will be further understood that the terms "comprises" and/or "comprising," when used in this specification, specify the presence of stated components, but do not preclude the presence or addition of one or more other components. Like numbers refer to like components throughout the specification. The term "and/or" includes any and all combinations of one or more of the described components. It should be understood that, although terms such as "first," "second," and the like may be used herein to describe various components, these components are not limited by these terms. These terms are only used to distinguish one element or component from another element or component. Therefore, of course, a first component described below could be termed a second component without departing from the scope and spirit of the present invention.

Unless otherwise defined, all terms (including technical and scientific terms) used herein have the same meaning as commonly understood by a person having ordinary skill in the art to which the present invention pertains. Further, unless defined otherwise, all terms defined in generally used dictionaries may not be overly interpreted.

The term "unit" or "module" used herein means a software or hardware component, such as field-programmable gate array (FPGA) or application-specific integrated circuit (ASIC), which performs certain tasks. However, the "unit" or "module" is not limited to software or hardware. A "unit" or "module" may be configured to reside in an addressable storage medium and configured to operate one or more processors. Thus, a "unit" or "module" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided for in the components and "unit" or "module" may be combined into fewer components and "unit" or "module" or further separated into additional components and "unit" or "module."

Spatially relative terms such as "below," "beneath," "lower," "above," and "upper" may be used herein to easily describe a correlation between one component and another component as shown in the drawings. Spatially relative terms should be understood as a term including directions that are different from one another of the components at the time of use or operation in addition to the directions shown in the drawings. For example, when inverting a component shown in the drawings, the component described as "below" or "beneath" of another component may be placed "above" another component. Accordingly, the exemplary term "below" can include both downward and upward directions. Components can also be oriented in different directions, and accordingly, spatially relative terms can be interpreted according to orientation.

In the present specification, a computer may refer to any type of hardware device including at least one processor and may be understood as a meaning encompassing a software component operating in a corresponding hardware device according to embodiments. For example, a computer can be understood as a meaning including all user clients and applications that run on smart phones, tablet personal computers (PCs), desktops, laptops, and each device, and the present invention is not limited thereto.

Hereinafter, embodiments of the present invention will be described in detail with reference to the accompanying drawings.

Although it will be described that each operation described in the present specification is performed by a computer, the subject of each operation is not limited thereto, and at least a portion of each operation may be performed on different devices according to embodiments.

FIG. 1 is a diagram illustrating a digital tissue storage box according to an embodiment of the present invention.

Referring to FIG. 1, a digital tissue storage box 10 according to the embodiment of the present invention may include a main body 100 having a space for storing tissues, an entrance 200 which is formed in one surface of the main body 100 and through which the tissue is pulled out of the main body 100, one or more displays 300 on which a screen is displayed according to a user input, one or more sensors 400 provided on the main body 100 to detect movement and an environment in a preset area, and a processor 500 which controls one or more displays 300 according to a user input or a result detected by the sensor 400. Here, the processor 500 may be a component embedded in the tissue storage box 10.

The tissue storage box 10 has a form inserted onto commonly used angular tissues, and one surface of the tissue storage box 10 may not be formed. For example, since a lower surface of the tissue storage box 10 is not formed, the tissue storage box 10 according to the embodiment of the present invention may be inserted onto the angular tissues from top to bottom.

In addition, the tissue storage box 10 may have a form in which tissues are accommodated and may have a separate hole through which tissues may be inserted. For example, a lower surface of the tissue storage box 10 may be formed in the form of a lid, and when the lower surface is opened, a hole through which tissues may be accommodated may be formed. Tissues are accommodated inside the tissue storage box 10, and then the lower surface is closed, thereby implementing the tissue storage box 10 according to the embodiment of the present invention. However, a shape of the tissue storage box 10 is not limited thereto.

The tissue storage box 10 may be basically formed in the form of common angular tissues and thus may include four side surfaces, the lower surface, and an upper surface in which the entrance 200, through which a tissue is pulled out, is formed. Meanwhile, a shape of the angular tissue may be mainly a rectangular parallelepiped shape or a regular hexahedron shape, and accordingly, the tissue storage box 10 may also be formed in a rectangular parallelepiped shape or a regular hexahedron shape. However, the present invention is not limited thereto.

The display 300 may be provided on each of the four side surfaces of the tissue storage box 10, but the present invention is not limited thereto. For example, when one surface of the tissue storage box 10 is placed close to a wall to use the tissue storage box 10, since the display 300 on the one surface close to the wall cannot be used, the display 300 may be provided only on three side surfaces excluding the one surface close to the wall.

In addition, when the tissue storage box 10 is used to be placed close to a wall, the display 300 may be provided only on one surface opposite to the wall such that all users can use the display 300. When the plurality of displays 300 are provided, an amount of information, which can be checked through the displays 300 at once, is increased, and also, by changing the display 300 on which a desired screen is output according to a position of a user, it is possible to check information through the screen no matter where a user is positioned. Meanwhile, when only one display 300 is provided, a unit price of the tissue storage box 10 may be reduced.

Figure 2:
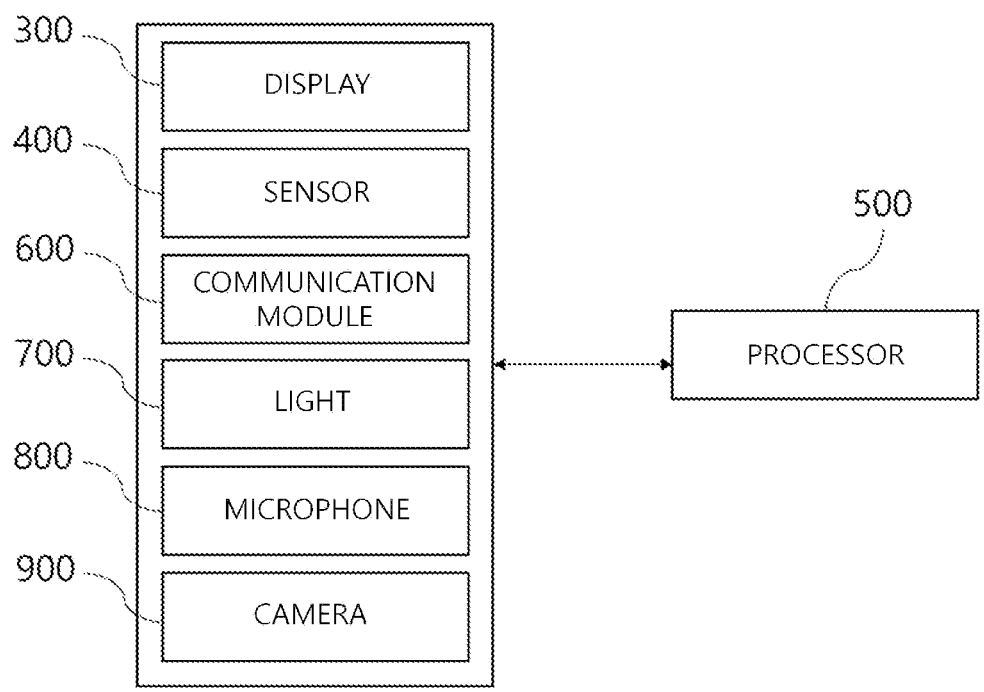
FIG. 2 is a diagram illustrating devices controlled by a processor of the tissue storage box according to an embodiment of the present invention.

FIG. 2 is a diagram illustrating devices controlled by the processor of the tissue storage box according to an embodiment of the present invention.

Referring to FIG. 2, the processor 500 may control the display 300, the sensor 400, a communication module 600, a light 700, a microphone 800, and a camera 900 according to a user input.

The display 300 may be clicked or touched by a user, and a screen controlled by the processor 500 may be displayed according to a user input.

For example, a user may touch a setting icon displayed on one or more displays, and the processor 500 may perform control so that a setting screen, through which each screen may be set, is output. Meanwhile, it has been described that the setting screen is output when the setting icon is touched, but the present invention is not limited thereto. For example, when a preset operation in which a user presses and holds one or more displays 300 for a certain time or touches the display 300 several times with several fingers is input, the processor 500 may perform control so that the setting screen is output.

In addition, a user may touch a setting icon displayed on each of the plurality of displays 300, and the processor 500 may perform control so that a setting screen, through which only a screen of a corresponding display to which a touch operation is input may be set, is output.

The processor 500 may set a main screen and perform control so that the set main screen is output on one or more displays 300, and the main screen may be a screen displayed on one or more displays 300 when there is no separate input. For example, a user may set a screen configuration such that a schedule screen is displayed on a first display and a weather screen is displayed on a second display, and based on the screen configuration set by the user, the processor 500 may control the first display to continuously display the schedule screen and control the second display to continuously display the weather screen.

When a request for outputting another screen is input while the main screen is being controlled to be output, the processor 500 may perform control so that the main screen is changed into the requested screen and output. For example, a user may want to check weather information about a display which is displaying a calendar screen as a basic screen. The processor 500 may perform control so that the calendar screen is changed into the weather screen and displayed based on an input of the user. In this case, the processor 500 may perform control so that the weather screen is displayed for a preset time and may perform control so that the weather screen is displayed until a separate end button is input.

Here, a user input may include an input through a touch of the display 300, an input through a specific gesture, an input through another terminal connected to the tissue storage box 10, and the like, but the present invention is not limited thereto.

In addition, the processor 500 may set a main display and may perform control so that a sub screen according to a user input is output on the main display 300. For example, when a request for outputting another screen is input while the main screen is being controlled to be output, the processor 500 may perform control so that the screen, which is requested to be output, is output on the main display. For example, a user may want to check weather information on the main display which is displaying a calendar screen as a basic screen. The processor 500 may perform control so that the calendar screen is changed into the weather screen to be displayed based on a user input. Here, a user input may include an input through a specific gesture, an input through another terminal connected to the tissue storage box 10, and the like, but the present invention is not limited thereto. That is, when a user makes a specific gesture to request an output of another screen, the processor 500 may perform control so that a screen corresponding to the gesture is output on the main display.

The processor 500 may perform control so that at least one screen of the display 300 is turned on or off according to a preset condition. The processor 500 may turn the screen of the display 300 on or off based on a preset time or period. For example, the processor 500 may turn the screen of the display 300 on after 6:00 am and turn the screen of the display 300 off after 12:00 pm. Here, when the tissue storage box 10 includes the plurality of displays 300, all the displays 300 may be turned on or off, and one or more displays 300 may be turned on or off according to a setting of a user.

As another example, when movement of a user is not detected in a preset area from the tissue storage box 10, the processor 500 may turn the screen of the display 300 off, and when movement of a user is detected while the screen of the display 300 is turned off, the processor 500 may turn the screen of the display 300 on. That is, when a user is near the tissue storage box 10, the processor 500 may perform control so that the screen of the display 300 is turned on, thereby allowing a user to check information output through the display 300, and when the user is not near the tissue storage box 10, the processor 500 may perform control so that the screen of the display 300 is turned off, thereby saving power of the tissue storage box 10. In this case, movement of a user may be detected through the sensor 400 or the camera 900 which will be described below.

Figure 3:
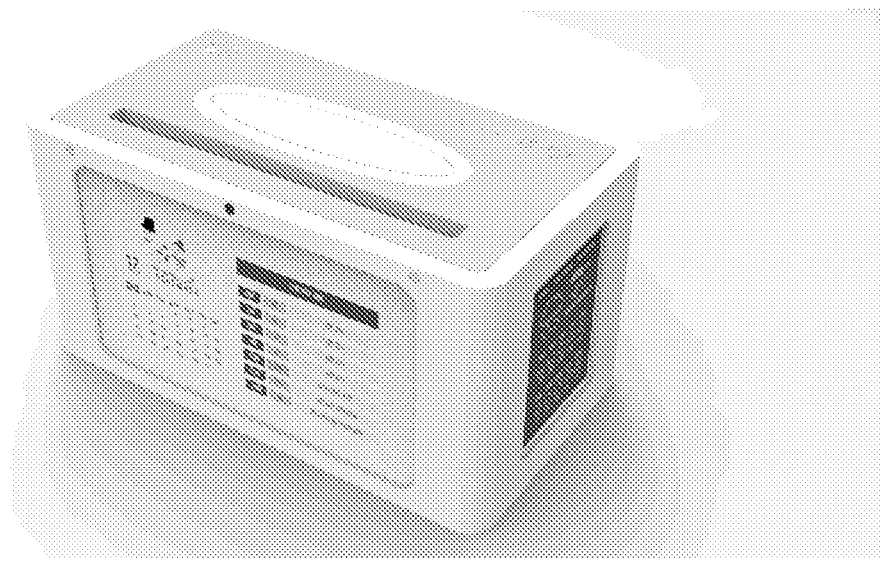
FIG. 3 is a diagram illustrating a display on which a main screen is output according to an embodiment of the present invention.

FIG. 3 is a diagram illustrating a display on which a main screen is output according to an embodiment of the present invention.

Referring to FIG. 3, the processor 500 may set a main screen according to a user input. A user may set a schedule screen on a first display 301 as a main screen and set a weather screen on a second display 302 as a main screen, and according to the setting of the user, the processor 500 may control the first display 301 to continuously display the schedule screen and control the second display 302 to continuously display the weather screen.

Referring to FIG. 2 again, the sensor 400 may detect at least one of illuminance, temperature, and humidity of a space in which the tissue storage box 10 is positioned and may transmit a detected result to the processor 500. The sensor 400 according to the embodiment of the present invention may include an illuminance sensor, a temperature sensor, and a humidity sensor, but the present invention is not limited thereto.

The processor 500 may perform control so that information about at least one of temperature and humidity detected by the sensor 400 is output on one or more displays 300. For example, a user may request information about current temperature and humidity in the house, and the processor 500 may obtain a result of detecting temperature and humidity of the space, in which the tissue storage box 10 is positioned, from the sensor 400, and may perform control so that a detected result is displayed on one or more displays 300.

Meanwhile, based on a shape of an angular tissue, sizes of the displays 300 provided in the tissue storage box 10 may be different. For example, the sizes of the displays 300 positioned on opposite side surfaces may be the same, and the sizes of the displays 300 positioned on adjacent side surfaces may be different. Accordingly, the processor 500 may change a configuration of a screen, on which the temperature and humidity of the space in which the tissue storage box 10 is positioned are to be displayed, according to the size of the display 300, and may perform control so that the screen is output according to the size of the display 300.

Figure 4:
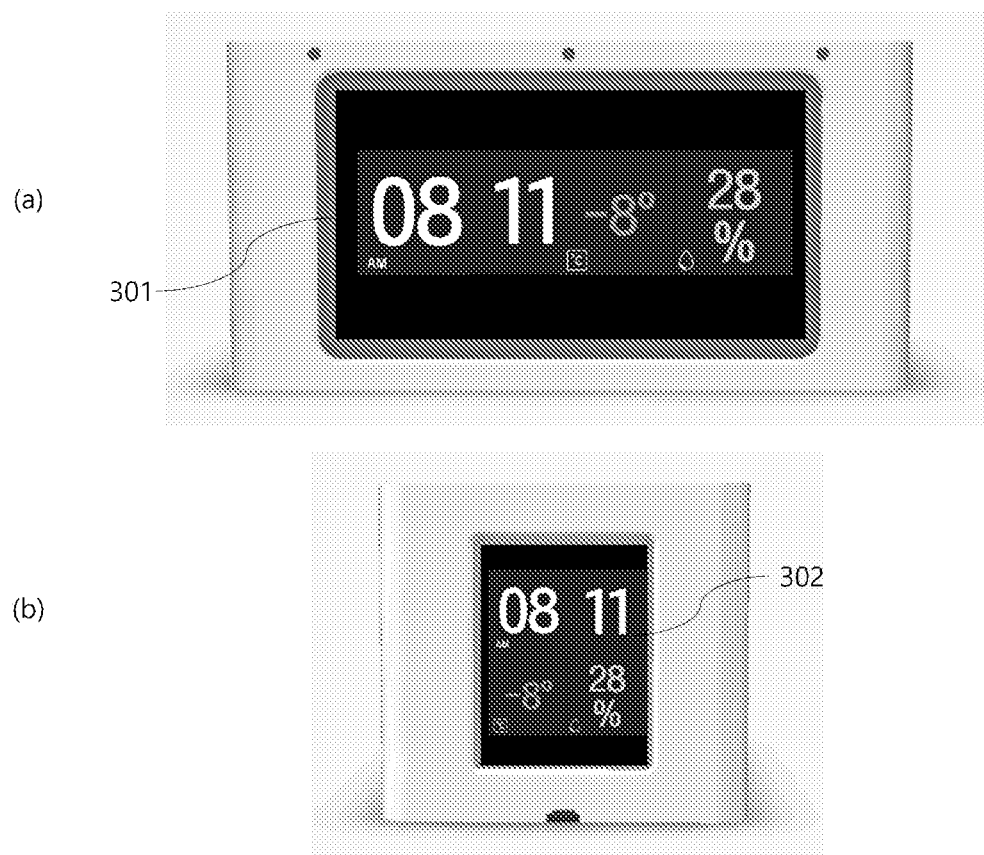
FIG. 4 shows diagrams illustrating examples of a screen according to a size of a display according to an embodiment of the present invention.

FIG. 4 shows diagrams illustrating examples of a screen according to a size of a display according to an embodiment of the present invention.

Referring to FIG. 4, (a) and (b) show the same screen output on displays having different sizes. For example, the first display 301 may be a display having a shape that is laterally elongated, and the second display 302 may be a display that is vertically elongated.

In a case in which a screen on which current time, temperature, and humidity are displayed is output on the first display 301, when the first display 301 is laterally divided into three equal areas, the processor 500 may output a screen in which the current time, temperature, and humidity are displayed in three divided equal areas.

In a case in which a screen on which current time, temperature, and humidity are displayed is output on the second display 302, when the second display 302 is divided into two equal areas, the processor 500 may output a screen in which the current time is displayed in an upper area and may output, when a lower area is laterally divided into two equal areas again, a screen in which the temperature and humidity are displayed in two divided equal areas.

Referring to FIG. 2 again, the processor 500 may perform control so that brightness of one or more displays 300 becomes preset brightness in response to a result of detecting illuminance of a space in which the tissue storage box 10 is positioned. Here, the processor 500 may store the brightness of the display 300 according to illuminance. The brightness of the display 300 according to the illuminance may be a set value or may be a value set according to a user input. For example, the processor 500 may perform control so that a setting screen, through which the brightness of the display 300 may be adjusted according to illuminance, is output, and may store the brightness of the display 300 according to illuminance set by a user. In addition, the processor 500 may detect and store brightness of the space in which the tissue storage box 10 is positioned according to brightness of the display 300 set by a user while the tissue storage box 10 is in use. Thereafter, the processor 500 may control the display 300 at brightness of the display 300 that matches illuminance among stored illuminances which has the same value as a result of detecting illuminance of the space in which the tissue storage box 10 is positioned.

For example, a user may set brightness of the display 300 to 100% during daytime in which illuminance is high and may set brightness of the display 300 to 30% during nighttime in which illuminance is low. The processor 500 may store the brightness of the display 300 according to the illuminance. Thereafter, when it is nighttime, the processor 500 may control the display 300 to have 30% brightness.

The processor 500 may control one or more displays 300 to decrease brightness when detected illuminance is low and may control one or more displays 300 to increase brightness when illuminance is high.

Also, the sensor 400 may detect movement of a user in a preset area and may transmit a detected result to the processor 500.

The processor 500 may determine a position of a user based on a result in which movement of the user is detected by the sensor 400. Based on a determination result, the processor 500 may perform control so that a screen is output to one area closer to the user in a display area in which the screen is being output or may perform control so that a screen is output on a display positioned close to the user among one or more displays.

Here, the sensor 400 may detect movement in a preset area, and based on a result detected by the sensor 400, the processor 500 may determine an object of the detected movement. For example, when an object falls or shakes, the sensor 400 may detect movement, and even when a pet moves, the sensor 400 may detect movement. Accordingly, the processor 500 may determine a moving object and may control the display 300 only when the moving object is a person.

In addition, the processor 500 may determine a user's gaze using at least one of a result in which movement of a user is detected by the sensor 400 and a result in which a preset area is photographed by the camera 900. Here, the camera 900 may be provided on the main body 100 to photograph the preset area and transmit a photographed result to the processor 500, and the preset area may refer to a range in which the camera 900 can capture images.

The camera 900 may photograph a user positioned in the preset area, and the processor 500 may determine a user's gaze by analyzing a captured image or video and a result detected by the sensor 400. The processor 500 may perform control so that a screen is output to one area to which a user's gaze is directed in an area of the display 300 on which the screen is being displayed according to a result of determining the user's gaze or may perform control so that a screen is output on a display positioned close to the user among one or more displays.

Figure 5:
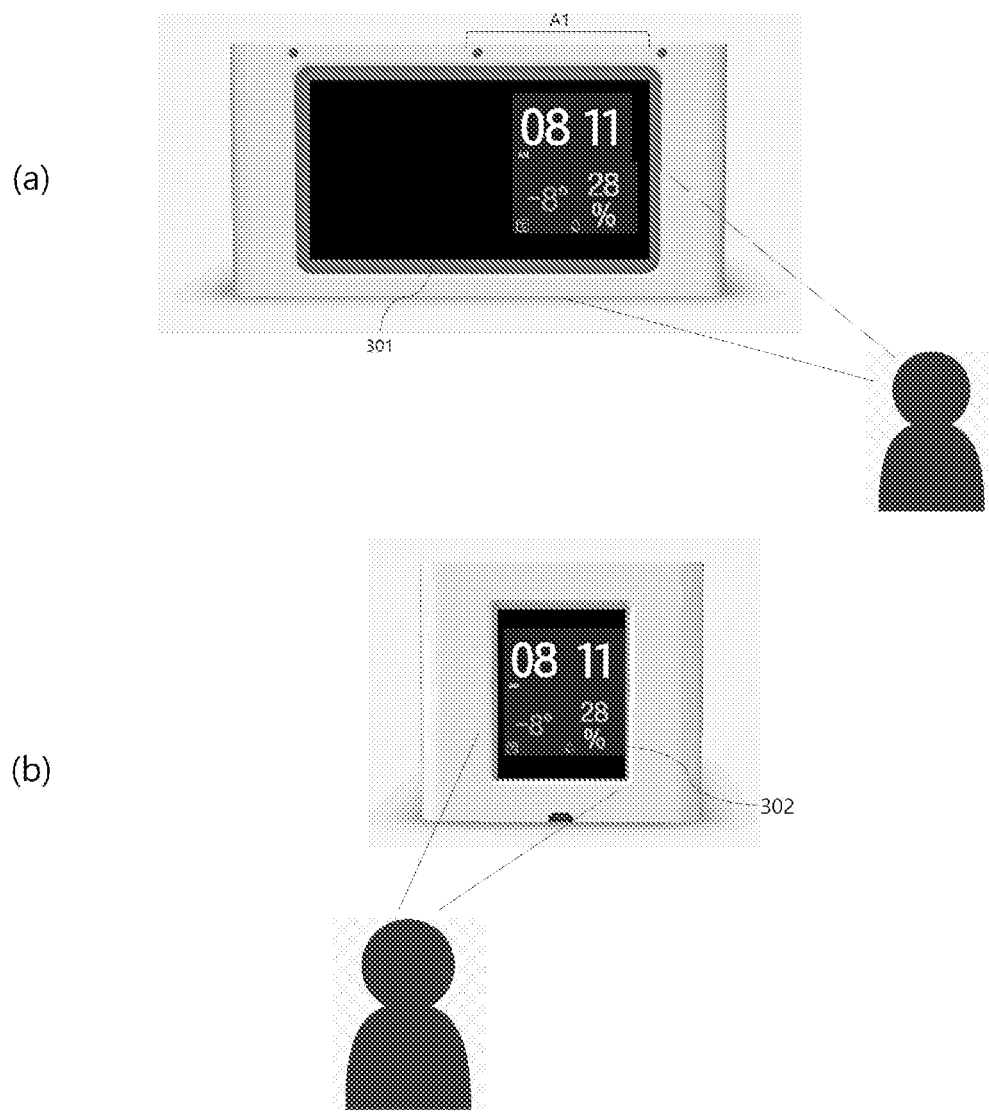
FIG. 5 shows diagrams illustrating screen configurations according to a position of a user and a user's gaze according to an embodiment of the present invention.

FIG. 5 shows diagrams illustrating screen configurations according to a position of a user and a user's gaze according to an embodiment of the present invention.

Referring to FIG. 5, when a user is positioned at a side of the tissue storage box 10, the processor 500 may determine that the user is positioned at the side of the tissue storage box 10 based on a result detected by the sensor 400 and a result photographed by the camera 900.

Referring to (a) of FIG. 5, the processor 500 may change a screen configuration such that a screen output on the first display 301 is output to one area Al close to a side at which a user is positioned. That is, when the first display 301 is viewed from the front, the first display 301 may output a screen biased to one side.

Referring to (b) of FIG. 5, when a user is positioned at a side of the tissue storage box 10, the processor 500 may perform control so that a screen is output on the second display 302 positioned close to the side at which the user is positioned.

In this case, a screen output on the first display 301 or the second display 302 may be a main screen or a screen according to a user input.

Referring to FIG. 2 again, the processor 500 may determine a distance between the tissue storage box 10 and a user using at least one of a detected result and a photographed result. For example, the processor 500 may determine a distance to a user by analyzing a size of the user in a captured image or video, a proportion of the user to the entire image, and a photographed area of the user (that is, an area from a head to a waist or an area from a head to a leg).

When the distance to the user is greater than or equal to a certain distance based on a result of determining the distance to the user, the processor 500 may control a display to increase an aspect ratio of a screen of the display to which a user's gaze is directed or increase a font size of a character output on the screen. That is, when a user is remotely viewing the display 300, the processor 500 controls the display 300 to increase an aspect ratio of a screen or increase a font size of a character output on the screen, thereby controlling the display 300 such that the user can more easily check information output on the display 300.

Figure 6:
FIG. 6 shows diagrams illustrating that an aspect ratio and a font size of a screen are changed to output the screen according to an embodiment of the present invention.

FIG. 6 shows diagrams illustrating that an aspect ratio and a font size of a screen are changed to output the screen according to an embodiment of the present invention.

(a) of FIG. 6 shows a screen of a display when a distance between the tissue storage box 10 and a user is less than a certain distance, and (b) of FIG. 6 shows a screen of a display when a distance between the tissue storage box 10 and a user is greater than or equal to the certain distance.

Referring to FIG. 6, the processor 500 may determine a distance between the tissue storage box 10 and a user using at least one of a detected result and a photographed result and may change a screen configuration of the display 300 based on a result of determining the distance to the user. For example, when the distance to the user is greater than or equal to a certain distance, the processor 500 may control a display to increase an aspect ratio of a screen of the display to which a user's gaze is directed or increase a font size of a character output on the screen.

Referring to FIG. 2 again, the processor 500 may recognize a user's gesture using at least one of a detected result and a photographed result and may control a screen of one or more displays 300 according to a screen configuration stored to match the recognized gesture and a screen setting. The processor 500 may perform control so that a setting screen, through which a screen according to a user's gesture is set according to a user input, is output on one or more displays 300 and may store contents set by a user. Thereafter, when a stored gesture is recognized, the processor 500 may perform control so that a screen stored to match the corresponding gesture is output on one or more displays 300. By performing a specific gesture, a user may select various operations of setting a screen to be output on the display 300, adjusting brightness of the screen, or changing the display 300 on which the screen is output, and an operation controlled according to a gesture is not limited thereto.

The tissue storage box 10 may be connected to a network server or other terminals through the communication module 600, and the communication module 600 may include a Wi-Fi module, a Bluetooth module, and the like which may be connected to a network or other terminals. Other terminals connected to the tissue storage box 10 may include a smartphone, a personnel computer (PC), a tablet PC, and the like of a user.

A user may input a command for controlling a screen of the display 300 using a user terminal, and the processor 500 may control screens of the plurality of displays 300 according to a command acquired through the user terminal.

In addition, the processor 500 may be connected to a network through the communication module 600 to acquire weather information and may perform control so that the acquired weather information is output on one or more displays 300.

In addition, the processor 500 may be connected to a specific website through the communication module 600 and may obtain a user account of the specific website and synchronize the tissue storage box 10 with the specific website. For example, the specific website may be Google, Naver, Kakao, or the like.

The processor 500 may obtain at least one account for each of a plurality of users. For example, when the tissue storage box 10 is used at home, since all family members use the tissue storage box 10, accounts for each of family members may be obtained.

The processor 500 may perform control so that a calendar stored in an account is linked and output on one or more displays 300 and may also perform control so that schedules stored in the calendar are linked and output on the display 300. Here, the processor 500 may perform control so that only a schedule of a designated user is output or may perform control so that all schedules of a plurality of users are output. For example, schedules on November $6^{th}$ and November $10^{th}$ may be stored in a calendar of a first user, and schedules on November $8^{th}$ may be stored in a calendar of a second user. The processor 500 may perform control so that schedules are listed and output in order of date and may perform control so that each schedule of a user is separately displayed. In this case, the processor 500 may perform control so that a schedule is output in a color designated for each user or may perform control so that an icon designated for each user is output next to a schedule of a corresponding user such that a schedule of each user may be distinguished.

In addition, the processor 500 may perform control so that an icon for selecting a user is output, and when one icon is selected, the processor 500 may perform control so that only a schedule of a corresponding user is displayed.

In addition, the processor 500 may perform control so that an alarm is output according to whether the alarm is set for each schedule. Here, the processor 500 may perform control so that an alarm is output according to an alarm stored when a calendar is linked and may perform control so that an alarm is output according to a separately set alarm through the tissue storage box 10. When an alarm is output, the processor 500 may perform control so that a corresponding schedule is displayed on a screen of one or more displays 300 and may output a preset alarm sound. In addition, the processor 500 may perform control so that the brightness of the display 300, on which the schedule is displayed, is maximized, or may control the light 700 to be turned on or flicker or perform control so that a color of the light 700 is changed.

Meanwhile, although it has been described that a calendar is linked according to an account and output on the display 300, a calendar stored in the processor 500 may be output on the display 300 without a separate account input. The processor 500 may provide a screen through which a schedule may be input according to a date or may provide a screen through which users may be distinguished according to input schedules.

Figure 7:
FIG. 7 is a diagram illustrating an example of a screen on which a calendar is output according to an embodiment of the present invention.

FIG. 7 is a diagram illustrating an example of a screen on which a calendar is output according to an embodiment of the present invention.

Referring to FIG. 7, the processor 500 may obtain an account of each of a plurality of users and may perform control so that a calendar stored in the account is linked and displayed on one or more displays 300. The processor 500 may perform control so that schedules stored in the linked calendar are output together and may perform control so that all schedules of the plurality of users are output. For example, the display 300 may display a schedule for a final exam on the $6^{th}$ to the $9^{th}$ and a schedule for school science research contest announcement on the $22^{nd}$ as a daughter's schedule, may display a schedule for a breakfast meeting on the $10^{th}$ as a father's schedule, and may display a schedule for a cultural symposium announcement on the $20^{th}$ as a mother's schedule. The schedules may be listed and output in order of date. In this case, the processor 500 may perform control so that a schedule is output in a color designated for each user or may perform control so that an icon designated for each user is output next to a schedule of a corresponding user such that a schedule of each user may be distinguished.

Referring to FIG. 2 again, the processor 500 may analyze an image or video captured by the camera 900 to determine a type of photographed food and may perform control so that nutrient and efficacy information corresponding to the determined food is output on one or more displays 300. The processor 500 may store nutritional information about nutrient and efficacy according to a type of food and may extract nutritional information of food corresponding to the determined type of food from the stored nutritional information.

Figure 8:
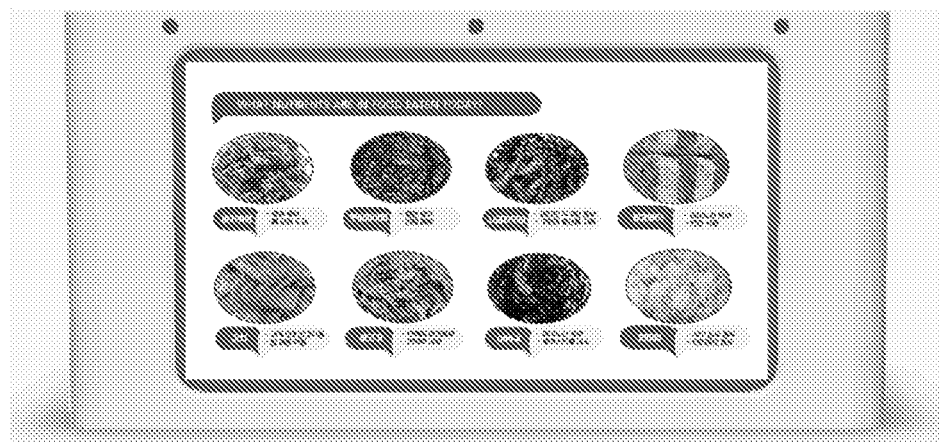
FIG. 8 is an example of a screen displaying nutrient and efficacy information according to a type of food according to an embodiment of the present invention.

FIG. 8 is an example of a screen displaying nutrient and efficacy information according to a type of food according to an embodiment of the present invention.

Referring to FIG. 8, the processor 500 may analyze an image or video captured by the camera 900 to determine a type of photographed food and may perform control so that nutrient and efficacy information corresponding to the determined food is output on one or more displays 300.

In addition, the processor 500 may provide a screen through which a menu item may be directly input and may perform control so that nutrient and efficacy information of food corresponding to a diet menu item is displayed on one or more displays 300 according to a user input.

In addition, the processor 500 may recommend a menu item. The processor 500 may plan a menu item that allows various nutrients to be ingested and may perform control so that nutrient and efficacy information for the planned menu item is output on the display 300. A user may set the number of side dishes constituting a menu item, and the processor 500 may plan a menu item corresponding to the set number of side dishes and may perform control so that the planned menu item is output on the display 300.

Referring to FIG. 2 again, the processor 500 may perform control so that information about taking of a medicine according to a user is output on one or more displays 300. The processor 500 may perform control so that an input screen, through which a medicine to be taken and a time for taking the medicine according to a user may be input, is output, and a user may input a medicine to be taken and a time for taking the medicine through the input screen output on one or more displays 300. The processor 500 may store contents input by a user and may perform control so that an alarm is output on time at which a medicine is to be taken based on the stored contents. The alarm may be output through a method of outputting a sound or voice through a speaker, increasing brightness of the display 300, or turning the light 700 on, but the present invention is not limited thereto.

Figure 9:
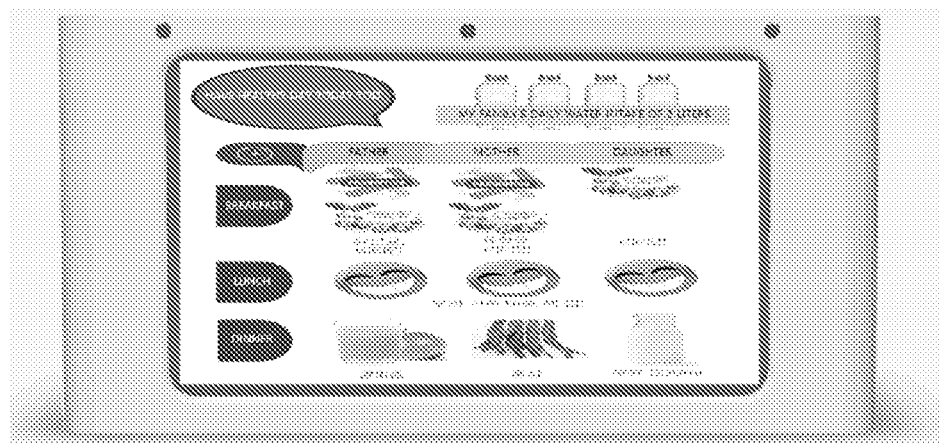
FIG. 9 is an example of a screen displaying information about taking of a medicine according to a user according to an embodiment of the present invention.

FIG. 9 is an example of a screen displaying information about taking of a medicine according to a user according to an embodiment of the present invention.

Referring to FIG. 9, the processor 500 may perform control so that an input screen, through which a medicine to be taken and a time for taking the medicine according to a user may be input, is output, and a user may input a medicine to be taken and a time for taking the medicine through the input screen output on one or more displays 300. The processor 500 may store contents input by a user and may perform control so that the stored contents is output on the display 300.

Meanwhile, the processor 500 may perform control so that information about taking of a medicine is output on an entire screen such that the information about the taking of the medicine may be identified for each user and for each time at a glance and may perform control so that information about taking of a medicine for each time is changed. That is, the processor 500 may perform control so that information on taking of a medicine to be taken in the morning is output during the morning hours, may perform control so that information about taking of a medicine to be taken at lunch time is output during the lunch hours, and may perform control so that information about taking of a medicine to be taken in the evening is output during the evening hours.

Referring to FIG. 2 again, the light 700 may be installed near the entrance 200. The light 700 is preferably formed at an edge of the entrance 200 to surround the entrance 200, but the present invention is not limited thereto. For example, a plurality of circular lights 700 may be formed near the entrance 200 at regular intervals.

The processor 500 may control the light 700 to be turned on or off and may perform control so that a color of the light 700 is changed. For example, the processor 500 may turn the light 700 on after 6:00 am and turn the light 700 off after 8:00 am. In addition, the processor 500 may control the light 700 to maintain an off state and turn the light 700 on when a separately provided button is pressed or a user input is acquired.

In addition, the processor 500 may control the light 700 to be turned on or off when a specific motion is detected from a user. For example, a user may clap once, and when such a motion of the user is detected, the processor 500 may control the turned-off light 700 to be turned on or control the turned-on light 700 to be turned off. In addition, when the turned-on light 700 is quickly tapped with a finger twice, the processor 500 may perform control so that a color of the light 700 is changed according to a preset order. For example, in a case in which colors are stored in order of a red color, a yellow color, a green color, and a blue color, when a specific motion is input from a user, the processor 500 may control the light 700 turned on in red to be changed in yellow and control the light 700 turned on in yellow to be changed in green. However, the present invention is not limited thereto, and the light 700 is controlled to change a color randomly, a color may be designated according to a motion, or the light 700 is controlled to change a color according to a motion input from a user.

In addition, an operation of turning the light 700 on or off and changing a color of the light 700 may be preset and performed, and a user operation of turning the light 700 on/off or changing a color is not limited.

In addition, the processor 500 may control the light 700 when an impact of a certain intensity or more is applied to the tissue storage box 10. A sensor for detecting an impact may be attached to the tissue storage box 10, and as a result in which the sensor detects an impact, the processor 500 may control the light 700 when an impact of a certain intensity or more is applied. For example, when an impact such as hitting a part of the tissue storage box 10 with a palm or lifting and putting down the tissue storage box 10 is applied, the processor 500 may turn the light 700 on or off or change a color of the light 700. Here, an impact of a certain intensity or more may be at a degree of intensity that does not put undue strain on the tissue storage box.

The processor 500 may register at least one piece of voice information received through the microphone 800 provided on one surface of the main body 100. The processor 500 may perform control so that a screen, through which a voice may be registered, is output on one or more displays 300, and may store voice information input through the microphone 800. The processor 500 may analyze and store a pitch, speed, volume, and the like of a voice input through the microphone 800. In this case, the processor 500 may acquire voice information about a plurality of users and may match each piece of voice information with a user to store the voice information.

After voice information is registered, the processor 500 may compare a voice input through the microphone 800 with a content of the registered voice information. The processor 500 may analyze a voice input through the microphone 800 and may compare the input voice with a stored voice to determine whether there is corresponding voice information.

When there is voice information corresponding to the voice input through the microphone 800, the processor 500 may perform control so that a screen of one or more displays 300 is changed according to a command corresponding to registered voice information. For example, when a user inputs a command "tell me the weather," the processor 500 may recognize the command to perform control so that a weather screen is output on one or more displays 300. Here, when it is determined that a user is positioned at a side of the tissue storage box 10, the processor 500 may perform control so that a weather screen is output on the display 300 positioned on a side surface of the tissue storage box 10.

Meanwhile, the tissue storage box 10 may be mainly placed on a dining table or table around which many users gather, and there may be cases in which the processor 500 recognizes voices in conversations between the users. In this case, a large amount of power may be required to analyze all of the voices, and an error of displaying a screen not requested by a user may occur. Accordingly, the processor 500 may analyze only a voice spoken after a specific word is spoken. For example, the processor 500 may analyze a voice obtained through the microphone 800 after a product name of the tissue storage box 10 is spoken.

In addition, a separate button may be provided in the tissue storage box 10, and the processor 500 may analyze a voice obtained through the microphone 800 after the corresponding button is pressed or may analyze a voice obtained through the microphone 800 while the corresponding button is pressed.

Also, the processor 500 may analyze a voice including a specific word. For example, when a voice includes words such as "do it," "show me," or "tell me," the processor 500 may compare the corresponding voice with registered voice information and may recognize a command through the voice to control the display 300.

The processor 500 may analyze a voice obtained through the microphone 800, may extract information on a user of the voice, and may set brightness and a font size of a screen displayed on the display 300 according to the user.

In addition, a speaker outputting a voice may be provided in the tissue storage box 10, the processor 500 may perform control so that a voice is output according to a user command, and settings of output voices may be different according to users. For example, when a user is an elderly woman, the processor 500 may perform control so that a volume of an output sound is maximized and may perform control so that a speed at which an answer to a user command is read is decreased.

Figure 10:
FIG. 10 shows diagrams illustrating a screen that is changed according to a user according to an embodiment of the present invention.
Figure 10:

FIG. 10 shows diagrams illustrating a screen that is changed according to a user according to an embodiment of the present invention.

Referring to FIG. 10, the processor 500 may set brightness and a font size of a screen displayed on the display 300 according to a user of a voice obtained through the microphone 800.

For example, when a user requests to be notified of the weather, the processor 500 may perform control so that a weather screen is output on the display 300. In this case, when the user of the obtained voice is an elderly woman, the processor 500 may perform control so that a screen on which a font size, an icon size, and the like are enlarged is output. Furthermore, the processor 500 may perform control so that brightness of the screen is maximized or may perform control so that the screen provides only brief information. That is, when a user is a student, the processor 500 may perform control so that a screen, on which all pieces of weather information for a week are displayed, is displayed, and when a user is an elderly woman, the processor 500 may perform control so that a screen, on which only today's weather is displayed in a large icon and a large font size, is output, and may also perform control so that brightness of the screen is maximized.

Referring to FIG. 2 again, the processor 500 may store an image captured through the camera 900 or at least one image obtained through the communication module 600 in a memory. The processor 500 may perform control so that a setting screen for setting a display sequence and a display time of images to be displayed is output on the display 300, and a user may set the display sequence and display time of the images through the setting screen. The processor 500 may store contents set by the user and may perform control so that images are displayed on one or more displays 300 according to the set contents. For example, when a user sets a sequence of three images and sets a display time to 10 seconds, the processor 500 may perform control so that the images are output every 10 seconds according to the sequence.

Figure 11:
FIG. 11 shows examples of screens displaying an image according to an embodiment of the present invention.

FIG. 11 shows examples of screens displaying an image according to an embodiment of the present invention.

Referring to FIG. 11, (a) shows a screen displaying a first sequence image set by a user, and the screen may be displayed on the display 300 for a display time set by the user. (b) shows a screen displaying a process in which an image is changed into a second sequence image set by a user after a display time set by the user has elapsed. (c) shows a screen displaying the second sequence image set by the user, and the screen may be displayed on the display 300 for a display time set by the user. Although it has been described that an image is changed while a connected image moves to the side, the present invention is not limited thereto.

Referring to FIG. 2 again, the processor 500 may perform control so that a menu obtained from a network server is output on one or more displays 300. In addition, the processor 500 may be connected to a store terminal and may receive a menu from the store terminal to output the menu on the display 300. The processor 500 may perform control so that origin information and nutrient component information of a prestored food material are output on the display 300 in response to a menu item selection command received from a user. For example, when a user clicks one menu item on a menu displayed on the display 300, the processor 500 may perform control so that a screen displaying origin information of a food material of the corresponding menu item and nutrient component information of the corresponding menu item is output. In addition, based on the nutrient component information, the processor 500 may calculate an amount of exercise required when the corresponding menu item is ingested and may perform control so that the calculated amount of exercise is output on the display 300. In this case, the processor 500 may calculate an amount of exercise for each menu item and perform control so that the calculated amount of exercise is output on the display 300, may determine a type of food through an image captured through the camera 900 after all ordered food is served, may calculate an amount of exercise required when the all food is ingested, and may perform control so that the calculated amount of exercise is output on the display 300.

In addition, the processor 500 may provide an order screen for ordering a menu item through the display 300. In this case, the processor 500 may transmit an order list of a user to a store terminal through the communication module 600, and a store staff may confirm an order through the store terminal.

The tissue storage box 10 may further include a power supply for supplying power to the tissue storage box 10, and the tissue storage box 10 may be used wiredly or wirelessly. That is, the power supply may supply power to the tissue storage box and a battery when connected to a socket in a wired manner and may supply power to the tissue storage box through the battery when not connected to the socket. In addition, the power supply may be used in a manner in which power is supplied only through the battery without separate charging and the battery is replaced when the battery is fully discharged.

In addition, the tissue storage box 10 may further include a cradle which is formed on one surface of the main body 100 and on which a terminal is mounted. The power supply may supply power to the terminal when the terminal is mounted on the cradle.

Although embodiments of the present invention have been described with reference to the accompanying drawings, it will be understood by those skilled in the art to which the present invention pertains that the present invention can be carried out in other detailed forms without changing the technical spirits and essential features thereof. Therefore, it should be understood that the above-described embodiments are illustrative and not restrictive in all aspects.

The invention claimed is:

1. A digital tissue storage box comprising:
a main body having a space for storing a tissue;
an entrance which is formed in one surface of the main body and through which the tissue is pulled out of the main body;
one or more displays which are provided on the main body and on which a screen is displayed according to a user input;
one or more sensors provided on the main body to detect movement and an environment in a preset area; and
a processor configured to control the one or more displays according to the user input or a result detected by the sensor, wherein:
the processor sets a screen configuration set by a user as a main screen of the display and performs control so that the set main screen is output on the one or more displays;
based on the user input, the processor sets a screen configuration according to movement of the user as a sub screen; and
based on a result of detecting the movement of the user, the processor performs control so that the main screen, which is output on the display, is changed into and outputs the sub screen.

2. The digital tissue storage box of claim 1, wherein:
the sensor detects movement of a user in the preset area and transmits a detected result to the processor;
based on the detected result, the processor determines a position of the user; and
the processor, based on a determination result, performs control so that a screen is output to one area closer to the user in an area of a display on which the screen is being output, or based on the determination result, controls the display to output the screen on a display positioned close to the user among the one or more displays.

3. The digital tissue storage box of claim 2, further comprising a camera provided on the main body to photograph the preset area and transmit a photographed result to the processor,
wherein:
the processor determines the user's gaze using at least one of the detected result and the photographed result; and
the processor, based on a determination result, performs control so that the screen is output to one area to which the user's gaze is directed in the area of the display in which the screen is being displayed, or based on the determination result, controls the display to output the screen on a display positioned in a direction in which the user's gaze is directed among the one or more displays.

4. The digital tissue storage box of claim 3, wherein:
the processor determines a distance between the digital tissue storage box and the user using at least one of the detected result and the photographed result; and
based on a determination result, when the distance to the user is greater than or equal to a certain distance, the processor controls the display to increase an aspect ratio of a screen of the display, to which the user's gaze is directed, or increase a font size of a character output on the screen.

5. The digital tissue storage box of claim 3, wherein the processor recognizes a gesture of the user using at least one of the detected result and the photographed result and controls the screen of the one or more displays according to a screen configuration stored to match the recognized gesture or a screen setting.

6. The digital tissue storage box of claim 3, wherein the processor stores nutritional information about nutrients and efficacy according to a type of food, analyzes an image or video captured by the camera to determine a type of photographed food, extracts nutrient and efficacy information of the determined food from the nutritional information, and performs control so that the extracted nutrient and efficacy information is output on the display.

7. The digital tissue storage box of claim 1, wherein the processor obtains at least one user account, performs control so that a calendar stored in the user account is linked and displayed on the one or more displays, and performs control so that an alarm is output according to whether the alarm is set for each schedule.

8. The digital tissue storage box of claim 1, further comprising a light positioned near the entrance,
wherein, when a specific gesture is detected from a user or an impact of a certain intensity or more is applied to the digital tissue storage box, the processor turns the light on or off or changes a color of the light.

9. The digital tissue storage box of claim 1, further comprising a microphone provided on one surface of the main body,
wherein:
the processor registers at least one piece of voice information input through the microphone;
after registering the voice information, the processor compares a voice output through the microphone with a content of the registered voice information; and
when the voice input through the microphone corresponds to the content of the registered voice information, the processor performs control so that the screen of the one or more displays is changed according to a command corresponding to the registered voice information.

10. The digital tissue storage box of claim 9, wherein:
the processor analyzes a speed, a pitch, and a volume of the voice input through the microphone;
based on an analysis result, the processor determines a user of the voice input through the microphone; and
based on a screen setting that is stored to match each user, the processor performs control so that a screen to which screen brightness and a font size corresponding to the screen setting of the determined user are applied is output.

11. The digital tissue storage box of claim 1, comprising a communication module which is connectable to a network server or another terminal,
wherein the processor acquires weather information through the communication module to perform control so that the weather information is output on the one or more displays and controls the screen of the one or more displays according to a command received from a terminal connected through the communication module.

12. The digital tissue storage box of claim 11, wherein the processor stores one or more images obtained through the communication module in a memory, sets a display sequence and a display time for the one or more images based on the user input, and performs control so that the plurality of images are sequentially displayed on the one or more displays according to the set display time.

13. The digital tissue storage box of claim 11, wherein the processor performs control so that a menu obtained from the network server is output on the one or more displays, performs control so that origin information and nutrient component information of a prestored food material are displayed on the display in response to a menu item selection command input from a user, and calculates an amount of exercise required when a menu item is ingested based on the nutrient component information and performs control so that the calculated amount of exercise is output on the display.

14. The digital tissue storage box of claim 1, wherein:
the processor performs control so that the screen of the display is turned on or off according to a preset condition; and
the processor turns the screen of the display on or off based on a preset time or period, when movement of a user is not detected in the preset area from the digital tissue storage box for a certain time by the sensor, turns the screen of the display off, or in a state in which the screen of the display screen is turned off, when the movement of the user is detected by the sensor, turns the screen of the display on.

15. The digital tissue storage box of claim 1, further comprising a power supply configured to supply power to the tissue storage box,
wherein the power supply supplies power to the tissue storage box and a battery when connected to a socket in a wired manner and supplies power to the tissue storage box through the battery when not connected to the socket.

16. The digital tissue storage box of claim 15, further comprising a cradle which is formed on one surface of the main body and on which a terminal is mounted,
wherein the power supply supplies power to the terminal when the terminal is mounted on the cradle.

17. A digital tissue storage box comprising:
a main body having a space for storing a tissue;
an entrance which is formed in one surface of the main body and through which the tissue is pulled out of the main body;
one or more displays which are provided on the main body and on which a screen is displayed according to a user input;
one or more sensors provided on the main body to detect movement and an environment in a preset area; and
a processor configured to control the one or more displays according to the user input or a result detected by the sensor,
wherein:
based on the user input, the processor sets the one or more displays as a main display;
based on the user input, the processor sets a screen configuration according to movement of a user as a sub screen; and
based on a result of detecting the movement of the user, the processor performs control so that the sub screen is output on the main display.

18. A digital tissue storage box comprising:
a main body having a space for storing a tissue;
an entrance which is formed in one surface of the main body and through which the tissue is pulled out of the main body;
one or more displays which are provided on the main body and on which a screen is displayed according to a user input;
one or more sensors provided on the main body to detect movement and an environment in a preset area; and
a processor configured to control the one or more displays according to the user input or a result detected by the sensor,
wherein:
the sensor detects at least one of illuminance, temperature, and humidity of a space in which the digital tissue storage box is positioned and transmits a detected result to the processor; and
the processor performs control so that information about the at least one of the temperature and the humidity detected by the sensor is output on the one or more displays and performs control so that brightness of the one or more displays becomes preset brightness in response to a result of detecting the illuminance of the space in which the digital tissue storage box is positioned.

19. The digital tissue storage box of claim 18, wherein:
as a result of detecting the illuminance, the processor extracts a display brightness value that is stored to match the detected illuminance and controls the one or more displays to have the extracted display brightness value;
when the detected illuminance is low, the processor controls the one or more displays to decrease brightness; and
when the illuminance is high, the processor controls one or more displays to increase brightness.

* * * * *